United States Patent [19]

Stewart et al.

[11] Patent Number: 6,136,120
[45] Date of Patent: Oct. 24, 2000

[54] METHOD AND APPARATUS FOR SEALING THE CORNERS OF A FABRIC ARTICLE

[75] Inventors: Parks C. Stewart; Robert A. Trobaugh, III, both of Duluth, Ga.

[73] Assignee: Phoenix Automation, Inc., Norcross, Ga.

[21] Appl. No.: 09/228,093

[22] Filed: Jan. 11, 1999

Related U.S. Application Data

[62] Division of application No. 08/687,201, Jul. 25, 1996, Pat. No. 5,928,462.

[51] Int. Cl.$^7$ .................................................. B32B 31/26
[52] U.S. Cl. ............................. 156/88; 156/308.4; 26/4
[58] Field of Search ............................ 156/88, 251, 82, 156/308.2, 308.4, 309.6, 359, 497, 499, 538, 539; 26/4; 66/172 R

[56] References Cited

U.S. PATENT DOCUMENTS

| | | |
|---|---|---|
| 2,465,254 | 3/1949 | Morel ............................................ 28/1 |
| 2,849,347 | 8/1958 | Uziel ......................................... 154/116 |
| 2,955,342 | 11/1960 | Litzler ........................................... 26/54 |
| 3,322,584 | 5/1967 | Welin-Berger ............................. 156/82 |
| 3,837,051 | 9/1974 | Osthoff et al. ................................. 26/3 |
| 4,065,538 | 12/1977 | Gustafson et al. ....................... 264/154 |
| 4,755,242 | 7/1988 | Miller et al. ............................... 156/88 |
| 4,794,677 | 1/1989 | Strudel ........................................... 26/3 |
| 5,069,735 | 12/1991 | Reynolds ................................. 156/497 |

*Primary Examiner*—Michael W. Ball
*Assistant Examiner*—Michael A Tolin
*Attorney, Agent, or Firm*—Jones & Askew, LLP

[57] ABSTRACT

The invention provides an apparatus for sealing a corner of a fabric article. The invention includes a conveyor for maneuvering the fabric article along a predetermined path and has an air gun positioned adjacent to the path. The air gun has maneuvering means for motion about the path. The air gun blows air onto the corner of the fabric article as the article is maneuvered along the path adjacent to the air gun.

4 Claims, 3 Drawing Sheets

METHOD AND APPARATUS FOR SEALING THE CORNERS OF A FABRIC ARTICLE

This is a division of application Ser. No. 08/687,201, filed Jul. 25, 1996, now U.S. Pat. No. 5,928,462.

TECHNICAL FIELD

This invention relates to a method and apparatus for sealing the corners of a fabric article such as a napkin. More particularly, the invention seals the corners of a synthetic fabric article by blowing hot air thereon in a controlled manner.

BACKGROUND OF THE INVENTION

Manufacturers of high quality fabric articles, such as napkins, generally "finish" the corners of the article in some fashion. The threads in the corners have a tendency to unravel and present a nonuniform appearance unless the threads are sewn or fused together. Sewing the corners, however, is expensive and time consuming given the attention to detail that is required to produce a uniformly sewn article.

Attempts have been made in the past to seal the threads of a synthetic or blended fabric material article by applying heat to the article. For example, one known method uses a heated blade that seals the edges of the article as it cuts the fabric. The melted fabric material, however, tends to build up on and near the cutting blade. This buildup of material requires constant inspection and cleaning. The system therefore has limited efficiency because of the required down time. The excess melted material also tends to spoil the appearance of the finished product. Further, the heat generated from the cutting blade affects the efficiency and lifetime of the other mechanical items of the system in the immediate area of the blade. The heat also may present a safety hazard to the operator.

Another known system seals the fabric threads at the corner of an article by placing the fabric article between a hot wire and a porcelain plate. The hot wire cuts and seals the fabric. As with the first system, however, this method has significant maintenance and quality problems. The melted material also tends to build up on the plate or the wire. Further, the wire tends to break frequently because of the heat and force involved in the cutting action.

Other known methods have used a flame or heated air to seal the edges of multiple layers of plastic fabrics piled in a stack. For example, U.S. Pat. No. 2,849,347 to Uziel describes subjecting a stack of staggered layers of plastic material to flame or hot air to seal the edges of the material and to prevent fraying. The drawbacks to this method include the fact that the layers have a tendency to stick together, even if staggered. The method also inevitably fails to finish several layers due to uneven stacking. Further, this method is not adaptable to high quality fabric articles because heating the entire edge of an article tends to distort the straightness of the edge, and thus the uniform appearance of the article.

What is needed therefore is a means for sealing the corners of a fabric article in an efficient, automated process. Known system either require to much maintenance and attention or do not produce a sufficiently uniform and high quality product.

SUMMARY OF THE INVENTION

Stated generally, the present invention provides an apparatus for sealing a corner of a fabric article. The invention includes a conveyor for maneuvering the fabric article along a predetermined path and an air gun positioned adjacent to the path. The air gun has means for maneuvering about the path. The air gun blows air onto the corner of the fabric article as the article is maneuvered along the path adjacent to the air gun. In this fashion, the apparatus seals each corner of the fabric article. The fabric article may be a napkin or other high quality textile product. The method of the present invention includes the steps of advancing the fabric article along a conveyor, maneuvering a hot air source towards one of the corners of the fabric article, blowing hot air onto the corner of the fabric article, and maneuvering the hot air source away from the corner after a predetermined interval.

Specific embodiments of the present invention include having a plurality of air guns positioned adjacent to the predetermined path. At least one of the air guns is positioned on a first side of the predetermined path and at least one of the air guns is positioned on a second side of the path. The air guns blow hot air between about 400 and 600 degrees Fahrenheit. The air guns also may be cycled on and off at a predetermined interval.

The air gun maneuvering means are normally operative to direct the flow of air from the air guns away from the predetermined path and also have means operative to direct the air from the air guns towards the path. The air gun maneuvering means use a piston and rod assembly to maneuver the air guns.

The air gun maneuvering means have means for pivoting the air guns between a plane substantially perpendicular to the predetermined path and a plane substantially parallel to the path. The maneuvering means pivots the air guns towards the path into the substantially perpendicular plane when a corner of the fabric article advances along the path adjacent to the air guns, the air guns then remain in the substantially perpendicular plane for a predetermined length of time, and then the air gun maneuvering means pivots the air guns away from the path into the substantially parallel plane when a longitudinal edge of the fabric article advances along the path adjacent to the air guns or after the fabric article passes the air guns. Alternatively, the maneuvering means may have means for reciprocating motion of the air guns along an axis substantially perpendicular to the path.

The apparatus also has means for sensing the position of the fabric article at a predetermined location along the predetermined path and means responsive to the sensing means for activating the maneuvering means of the air gun. The sensing means include the use of a presence sensor.

The conveyor itself includes a plurality of belts to advance the fabric articles along a plurality of rails. The invention also may include a fan positioned adjacent to the conveyor. The fan blows cool air through the rails.

Thus it is an object of the invention to provide a method and apparatus for finishing the corners of a fabric article.

It is another object of the present invention to provide a method and apparatus for sealing the corners of a fabric article.

It is a further object of the present invention to provide a method and apparatus for sealing the corners of a fabric article without physical contact with that article.

It is a still further object of the present invention to provide a method and apparatus for sealing the corners of a fabric article with a blast of hot air.

It is a still further object of the present invention to provide a method and apparatus for sealing the corners of a fabric article without distorting the edges of the article.

It is a still further object of the present invention to provide a method and apparatus for finishing the corners of a fabric article in high-speed, efficient system.

It is a still further object of the present invention to provide a method and apparatus for finishing the corners of a textile article with minimal maintenance requirements.

Other objects, features, and advantages of the present invention will become apparent upon reading the following specification, when taken in connection with the drawings and the claims.

DETAILED DESCRIPTION OF THE INVENTION

Figure 1:
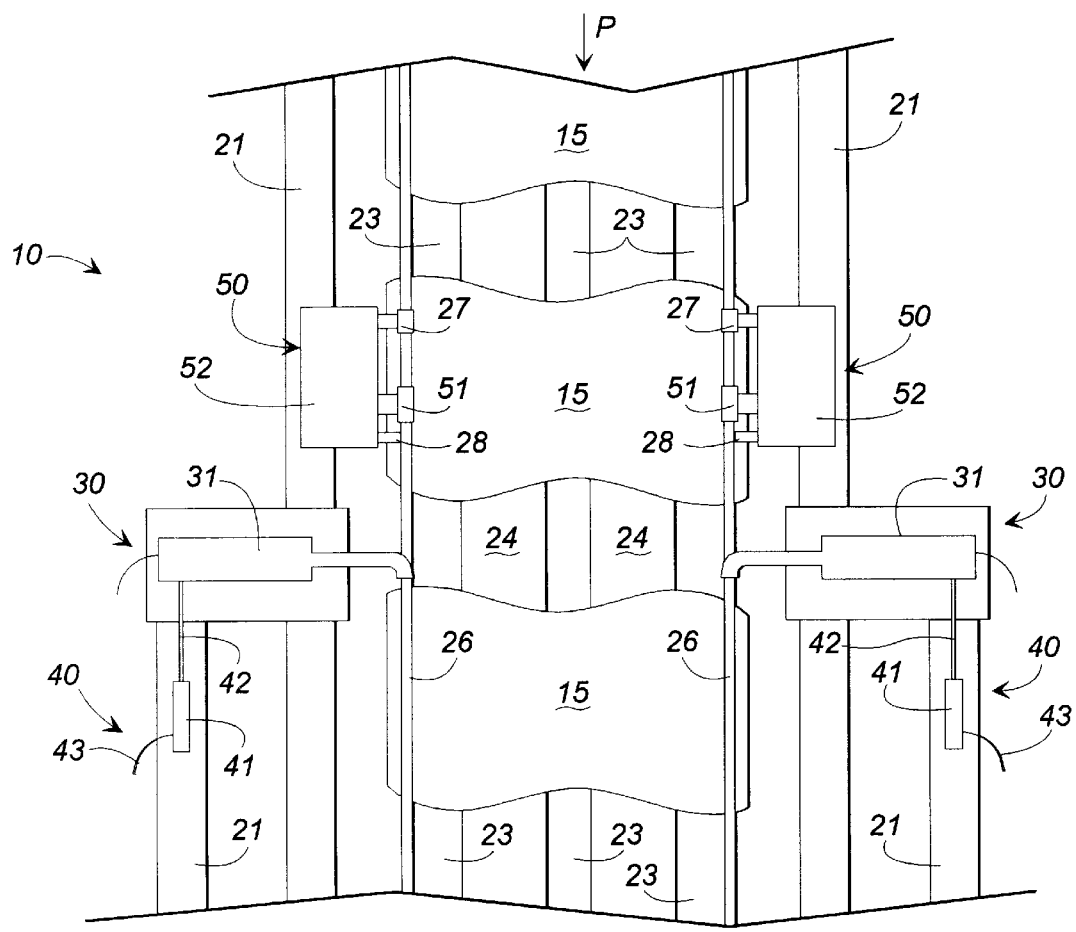
FIG. 1 is a plan view showing the major elements of a preferred embodiment of the present invention.
Figure 2:
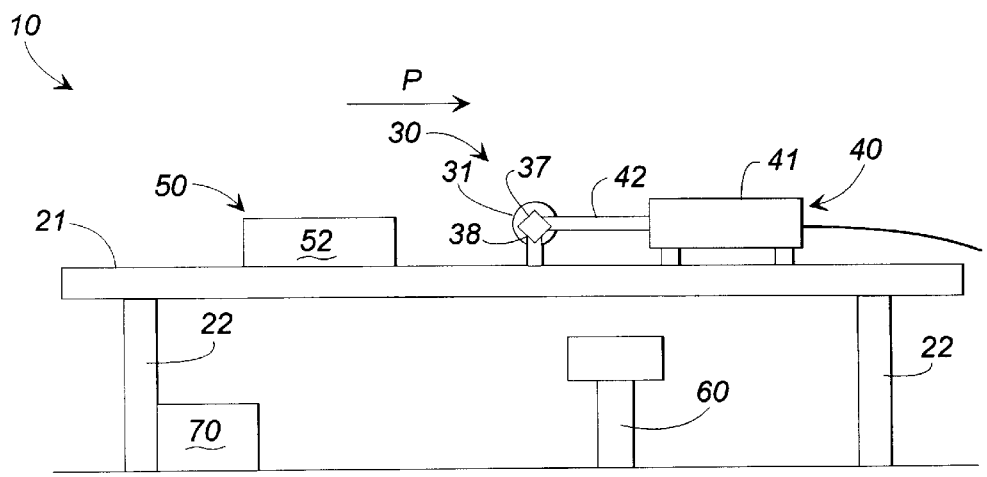
FIG. 2 is a side view showing the major elements of a preferred embodiment of the present invention.
Figure 3:
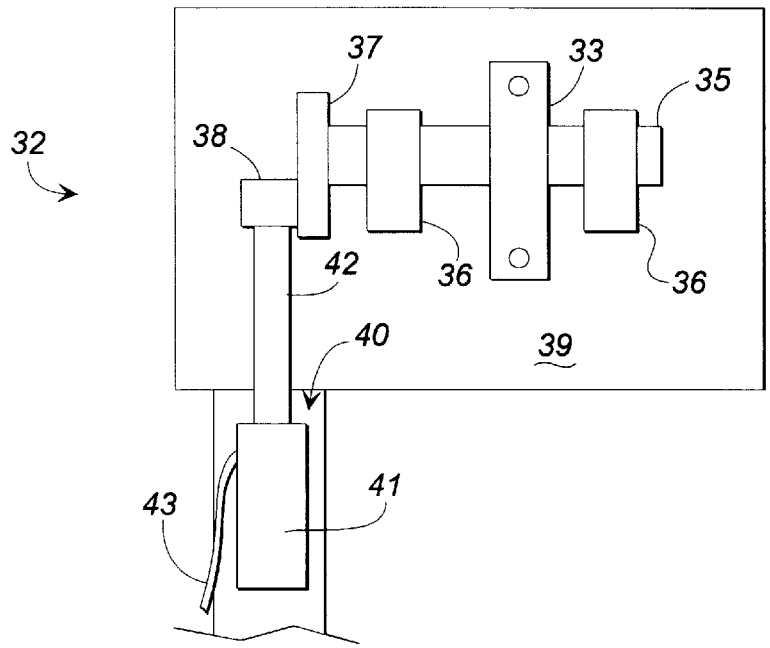
FIG. 3 is a plan view showing the air gun maneuvering unit.

Referring now to the drawings, in which like numerals represent like parts throughout the several views, FIGS. 1–5 show a preferred embodiment of a corner finishing apparatus 10 designed for use with a fabric article 15. The fabric article 15 may be made from any type of synthetic or blended material, such as polyester. The fabric article 15 is preferably a napkin or other high quality textile product. FIGS. 1 and 2 show the major elements of the apparatus 10. This embodiment of the invention employs the use of a conveyor 20 and one or more air gun units 30 positioned adjacent to the conveyor 20. The apparatus 10 may further include one or more cutting devices 50, also positioned adjacent to the conveyor 20, and a fan 60 positioned underneath or adjacent to the conveyor 20. The operation of the apparatus 10 is controlled and monitored by a processor 70, such as a programmable logic controller sold by General Electric.

The conveyor 20 defines a predetermined path P that runs adjacent to the air gun units 30. The conveyor 20 has a plurality of lateral support rails 21 positioned on top of a plurality of vertical legs 22. The conveyor 20 further includes a plurality of internal rails 23 positioned within the support rails 21. The internal rails 23 define a plurality of channels 24. The rails 23 are constructed from or covered by a substantially heat resistant or tolerant material, such as Teflon or stainless steel.

The fabric articles 15 are advanced along the conveyor 20 by means of one or more belts 26 that run in a longitudinal direction along the edges of the conveyor 20. The belts 26 run the length of the conveyor 20 and are powered by a series of rollers 27. The belts 26 stay in contact with the fabric articles 15 and pulls the articles 15 along the predetermined path P. The belts 26 also keep each fabric article 15 positioned correctly on the rails 23. The fabric articles 15 are generally spaced apart from one another on the conveyor 20 by a distance of one-quarter to two inches.

An electronic "eye" 28 or other type of "motion" or presence sensor also may be positioned adjacent to the conveyor 20. The eye 28 may be used to trigger the operation of the air gun units 30 as the fabric article 15 advances along the conveyor 20. The eye 28 signals the processor 70 to activate, as explained below, the air gun units 30 in a timely fashion.

Positioned adjacent to the conveyor 20 and the predetermined path P are one or more air gun units 30. Preferably, the air gun units 30 are positioned immediately adjacent to the conveyor 20 upon one or more of the support rails 21. The air gun units 30 each have an air gun 31, a maneuvering unit 32, and a piston unit 40. The maneuvering unit 32 is shown in plan view in FIG. 3. The air gun 31 is preferably a brushless heat gun such as the "Centennial HG200E" electronic control air gun sold by McMaster-Carr Corporation. The air gun 31 preferably has an one-eighth horsepower motor. The rating of the air gun 31 is preferably from about three to eight cubic feet per minute and can generate heat up to about 1000 degrees Fahrenheit.

The hot air produced by the air gun 31 must be hot enough to fuse the threads in the corners of the fabric article 15 without scorching the article 15 or distorting the edges of the article 15. Depending upon the type of material used for the article 15, the air gun 31 is typically set between 400 and 600 degrees Fahrenheit. The length of time the air gun 31 blows hot air on the article 15 also may be considered in determining the temperature of the air gun 31 and/or the speed of the conveyor 20. The air gun 31 may have multiple speed and temperature settings. The air gun 31 generally runs continuously, but may be cycled on and off by the apparatus 10. Further, the heating element (not shown) within the air gun 31 may be run continuously while the fan (not shown) within the air gun 31 is cycled.

The maneuvering unit 32 includes an air gun support base 33 upon which the air gun 31 is positioned. The air gun 31 is held in place on the support base 33 by a C-clamp 34 or other suitable mounting means. The support base 33 is affixed by welding or other means to a rod 35. The rod 35 is capable of rotation within one or more brackets 36. One end of the rod 35 terminates with a block guide 37 The rod 35 is joined to the block guide 37, also by screws, welding, or other conventional fastening means. The block guide 37 further includes a tab 38 protruding therefrom. The brackets 36 may be affixed to a plate 39 by screws, welding, or other conventional fastening means. The plate 39 is mounted upon the support rails 21 by screws, welding, or other conventional fastening means. The positioning of the maneuvering unit 32 on the support rails 21 may be varied according to the size and width of the fabric article 15.

The maneuvering unit 32 is powered by the piston unit 40. The piston unit 40 includes a piston 41 with a piston rod 42. The piston unit 40 is preferably pneumatic. Air is supplied to the piston 41 by an air tube 43 connected to a conventional compressed air source (not shown). The piston 41 is mounted to piston unit plate 44 by conventional fastening means. The piston plate 44 is in turn mounted on one of the support rails 21 by conventional fastening means. The piston rod 42 is connected to the tab 38 of the block guide 37 of the maneuvering unit 32 via screws or other conventional fastening means. When the piston rod 42 of the piston unit 40 is driven forward, the block guide 37 causes the rod 35, and hence the air gun 31, to rotate. The operation of the piston unit 40 is triggered and controlled by the processor 70.

The apparatus 10 may be used in conjunction with a cutting device 50. The cutting device 50 includes blade 51 such as a Barber Shear manufactured by Tek-Matic Corporation and powered by a motor 52, preferably a one-eighth horsepower motor. The cutting device 50 trims the article 15 to a predetermined width. The cutting device is positioned on the support rails 21 adjacent to the predetermined path P.

The position of the cutting device 50 may be varied according to the size and width of the fabric article 15. The cutting device 50 and the maneuvering unit 32 may be jointly positionable.

The apparatus 10 also may have a fan 60 positioned underneath the conveyor 20 in close proximity to the air gun units 30. The fan 60 preferably has a rating of between 5 and 50 cubic feet per minute. The fan 60 is positioned such that it blows air in the direction of the interior rails 23 and channels 24 in the vicinity of the air gun units 30 to keep the mechanical systems of the apparatus 10 cool. Any type of air movement device or cooling device may be used for the fan 60.

In use, the fabric article 15 is positioned on the conveyor 20. The article 15 is held in place by the belts 26 that run along longitudinal edge of the conveyor 20. Only a relatively small portion of the fabric article 15 extends beyond the longitudinal edge of the belts 26. The interior rails 23 support the fabric article 15 as it extends between the belts 26. The fabric article 15 is then advanced along the predetermined path P of the conveyor 20. The fabric article 15 may first pass through the cutting unit 50. The blade 51 cuts the longitudinal edge of the fabric article 15.

Figure 4:
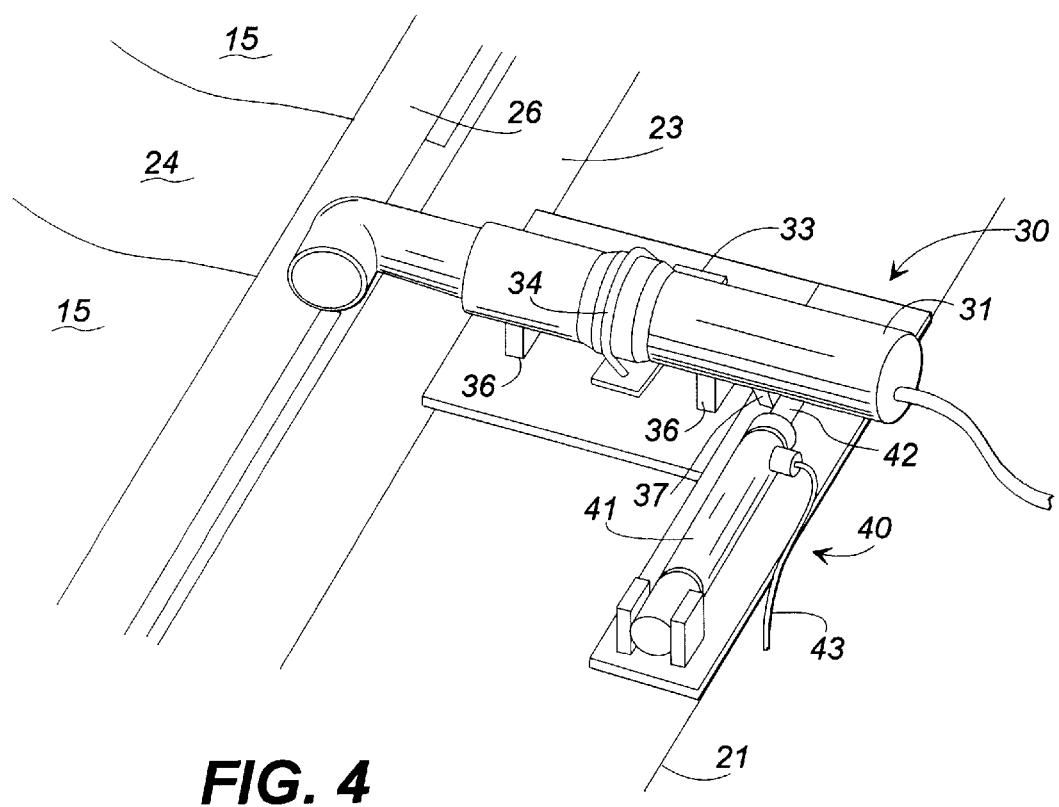
FIG. 4 is a perspective view showing the air gun in the "up" position.
Figure 5:
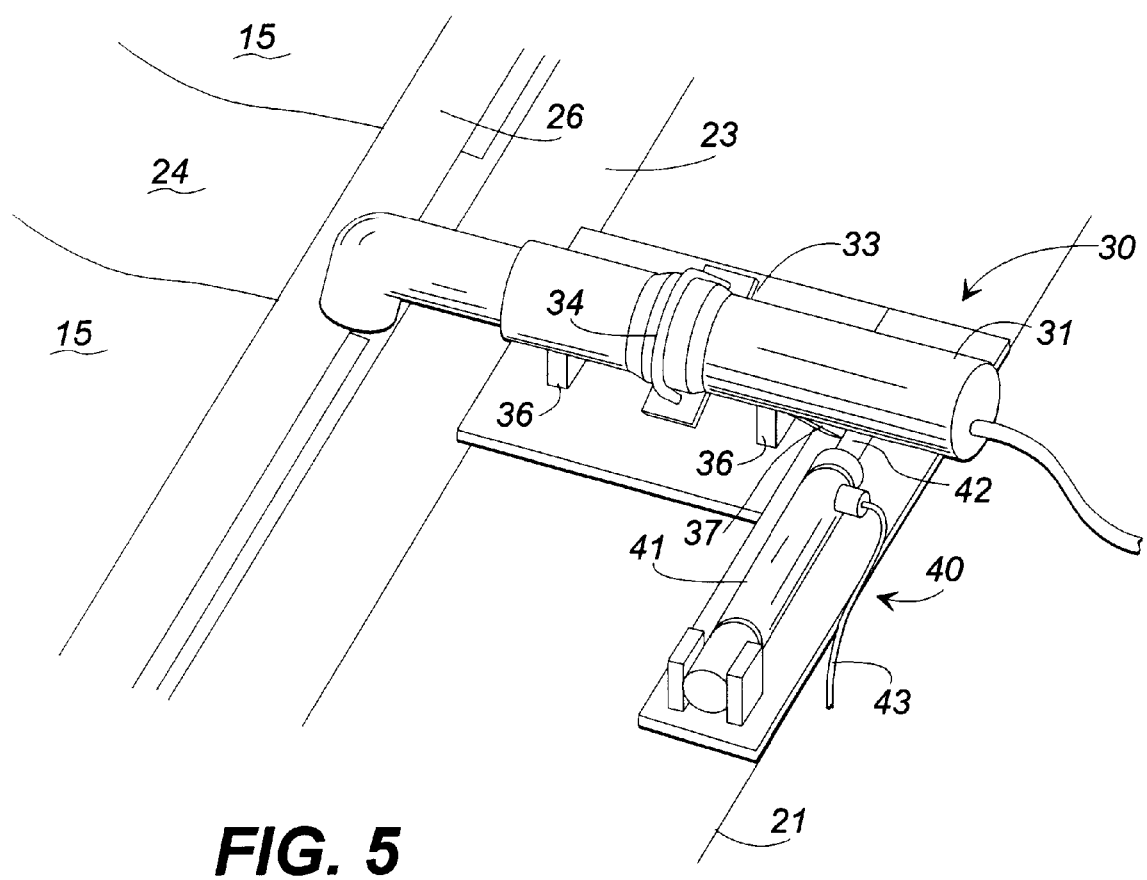
FIG. 5 is a perspective view showing the air gun in the "down" position adjacent to the corner of a napkin.

The fabric article 15 then approaches the air gun units 30. Preferably, at least one air gun unit 30 is positioned on each side of the predetermined path P of the conveyor 20. As is shown in FIGS. 4 and 5, when the fabric article 15 approaches the air gun unit 30, the air gun 31 is in the normal "up" position, i.e., the air gun 31 is blowing hot air into a plane substantially parallel to the predetermined path P rather than towards the predetermined path P. As the leading edge and first corner of the fabric article 15 approaches, the piston unit 40 is activated such that the maneuvering unit 32 of the air gun unit 30 pivots the air gun 31 into the "down" position, i.e., the air gun 31 is blowing hot air into a plane substantially perpendicular and onto the predetermined path P. Specifically, the piston 41 of the piston unit 40 drives the piston rod 42 forward. The piston rod 42 in turn drives forward the guide block 37 of the maneuvering unit 32. This forward movement causes the rod 35 to rotate such that the support base 33 and the air gun 31 are pivoted downward.

The hot air blowing from the air gun 31 causes the threads in the corner of the fabric article 15 to fuse in a uniform fashion. By way of example, a fabric article 15 constructed from polyester or a polyester/cotton blend has a melting temperature of about 400 to 600 degrees Fahrenheit. The conveyor 20 is operated at a speed of about thirty to forty feet per minute, such that the air gun 31 blows on the corner of the article 15 for approximately one second.

After the leading edge and the first corner of the fabric article 15 pass underneath the air gun 31, the air gun unit 30 is pivoted to the "up" position such that hot air does not blow on the longitudinal edge of the fabric article 15. Specifically, the piston unit 40 retracts and causes the maneuvering unit 32 and the air gun 31 to pivot into the "up" position.

As the fabric article 15 continues along the predetermined path P of the conveyor 20 and the trailing edge and second corner of the fabric article 15 approaches the air gun unit 30, the air gun 31 is again pivoted into the "down" position in the same manner as described above. Likewise, after the trailing edge and the second corner of the article 15 are advanced beyond the air gun unit 30, the air gun 31 is pivoted into the normal "up" position in the manner as described above. This process is then repeated for each fabric article 15 positioned upon the conveyor 20.

The timing of the air gun units 30 can be controlled by various methods. For example, the eyes 28 may signal the processor 70 as the leading edge of the fabric article 15 advances along the conveyor 20 when the article 15 reaches a predetermined location along the predetermined path P. The processor 70 would then cause the air gun unit 30 to rotate into position for a predetermined length of time as the first corner passes, rotate to the up position for a predetermined length of time as the edge of the fabric article 15 passes, rotate down again for a predetermined length of time as the second corner passes, and then return to the up position. The process is repeated for each article 15 on the conveyor 20. The amount of time the air gun unit 30 spends in each position is variable according to the type of material and the length of the fabric article 15, the speed of the conveyor 20, and the amount of heat generated by the air gun 31.

Alternatively, if the speed of the conveyor 20 is known and the distance between the fabric articles 15 is predetermined, the piston unit 40 can be set to pivot at a predetermined interval. Other types of conventional timing methods also may be employed.

The fan 60 blows cool air in the vicinity of the interior rails 23 and channels 24 adjacent to the air gun units 30. The cool air generated by the fan 60 keeps the internal rails 23 and the mechanical systems of the apparatus 10 cool and prevents a build up of heat caused by the air gun 31. The channels 24 permit the cool air from the fan 60 to reach the top of the conveyor 20.

Alternative embodiments of the present invention include mounting the air gun units 30 for reciprocating movement with the predetermined path P of the conveyor 20. For example, the maneuvering units 32 may be mounted for movement in a perpendicular axis to the direction of the predetermined path P. The piston units 40 would then drive the air guns 31 and the maneuvering units 32 along this perpendicular axis as the fabric article 15 advances along the predetermined path P of the conveyor 20. Further, the air guns 31 could be stationary. The air guns 31 would then be cycled such that they only blow hot air when the corner of a fabric article 15 passes.

Other embodiments employ the use of only one air gun 31 such that the fabric article 15 must travel along the conveyor 20 twice for all of the corners to be sealed. Conversely, other embodiments include the use of multiple air guns 31 such that all of the corners of the article 15 are sealed at one time.

From the foregoing description of the preferred embodiment and the several alternatives, other alternative constructions of the present invention may suggest themselves to those skilled in the art. Therefore, the scope of the present invention is to be limited only by the claims below and equivalence thereof.

We claim:

1. A method for sealing the corners of a fabric article, said fabric article comprising a plurality of edges and a plurality of corners, each said corner comprising a two dimensional area, said method comprising the steps of:

advancing said fabric article along a conveyor;

maneuvering a hot air source towards one of said plurality of corners of said fabric article as said article is advanced by said conveyor;

blowing hot air from said hot air source onto said one of said plurality of corners of said fabric article; and maneuvering said hot air source away from said one of said plurality of corners of said fabric article after a predetermined interval so as to avoid substantially blowing hot air onto one of said plurality of said edges.

2. The method of claim 1, wherein said maneuvering steps comprise reciprocating motion of said hot air source along an axis substantially perpendicular to said conveyor.

3. The method of claim 1, wherein said maneuvering steps comprise pivoting said hot air source between a plane substantially perpendicular to said conveyor and a plane substantially parallel to said conveyor.

4. A method for sealing the corners of a fabric article, said fabric article comprising a plurality of edges and a plurality of corners, each said corner comprising a two dimensional area, said method comprising the steps of:

advancing said fabric article along a conveyor;

blowing hot air from a hot air source onto said one of said plurality of corners of said fabric article as said article is advanced by said conveyor; and stopping said hot air source after a predetermined interval so as to avoid substantially blowing hot air onto one of said plurality of said edges.

* * * * *